(12) United States Patent
Hirai

(10) Patent No.: US 6,607,796 B1
(45) Date of Patent: *Aug. 19, 2003

(54) RESIN AIR BAG

(75) Inventor: Kinji Hirai, Kanagawa (JP)

(73) Assignee: Takata Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,510

(22) Filed: Mar. 17, 2000

Related U.S. Application Data

(62) Division of application No. 08/906,831, filed on Aug. 6, 1997, now Pat. No. 6,180,044.

(30) Foreign Application Priority Data

Aug. 6, 1996 (JP) .............................................. 8-207083

(51) Int. Cl.⁷ .......................... B60R 21/16; B60R 21/28
(52) U.S. Cl. ................. 428/35.2; 428/36.1; 280/728.1; 280/739; 280/743.1
(58) Field of Search ............................... 428/35.2, 35.5, 428/35.4, 36.1; 280/728.1, 743.1, 739

(56) References Cited

U.S. PATENT DOCUMENTS

| | | | | |
|---|---|---|---|---|
| 3,990,726 A | * | 11/1976 | Oka et al. ................. | 137/68.11 |
| 5,071,161 A | * | 12/1991 | Mahon et al. ............... | 280/739 |
| 5,429,786 A | | 7/1995 | Jogan et al. ................. | 264/255 |
| 5,452,914 A | | 9/1995 | Hirai ........................ | 280/743.1 |
| 5,520,415 A | * | 5/1996 | Lewis et al. ............. | 280/743.1 |
| 5,536,038 A | * | 7/1996 | Bollaert et al. .......... | 280/743.1 |
| 5,603,526 A | | 2/1997 | Buchanan ................ | 280/743.1 |
| 5,618,485 A | | 4/1997 | Gajewski ..................... | 264/255 |
| 5,618,595 A | | 4/1997 | Matsushima et al. .... | 280/728.1 |
| 5,630,620 A | | 5/1997 | Hirai et al. ............... | 280/728.1 |
| 5,650,115 A | | 7/1997 | Proos et al. ................. | 264/400 |
| 5,698,283 A | | 12/1997 | Yamasaki et al. ........ | 280/728.3 |
| 5,704,639 A | | 1/1998 | Cundill et al. ............. | 280/739 |
| 5,879,767 A | * | 3/1999 | Matsushima et al. ...... | 428/35.2 |
| 5,957,485 A | * | 9/1999 | Hirai ....................... | 280/743.1 |

FOREIGN PATENT DOCUMENTS

| | | |
|---|---|---|
| JP | 2-31965 | 2/1990 |
| JP | 4-266544 | 9/1992 |

* cited by examiner

Primary Examiner—Rena Dye
(74) Attorney, Agent, or Firm—Foley & Lardner

(57) ABSTRACT

An air bag made of resin which can be easily produced and of which volume in the folded state is small, a first resin sheet 1 and a heat resisting sheet 3 are disposed to be superposed on each other in a mold 7. The diameter of the heat resisting sheet 3 is smaller than that of the sheet 1 so that the periphery of the sheet 1 are exposed from the heat resisting sheet 3. Resin is injected into a cavity 13 through a sprue bushing end 12 to mold a second resin sheet 2 and to bond the sheet 2 to the sheet 1.

9 Claims, 8 Drawing Sheets

FIG. 7(a)
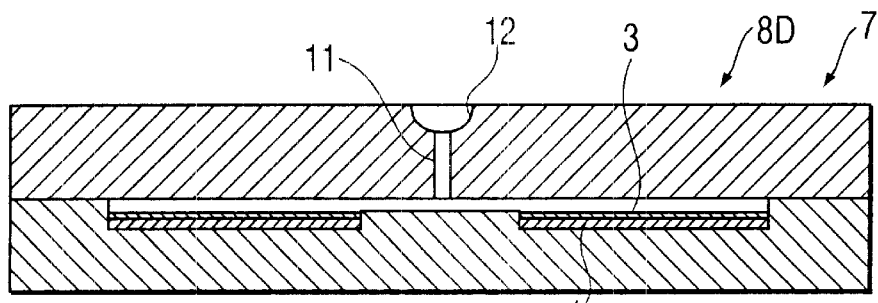
FIG. 7(b)
FIG. 7(c)
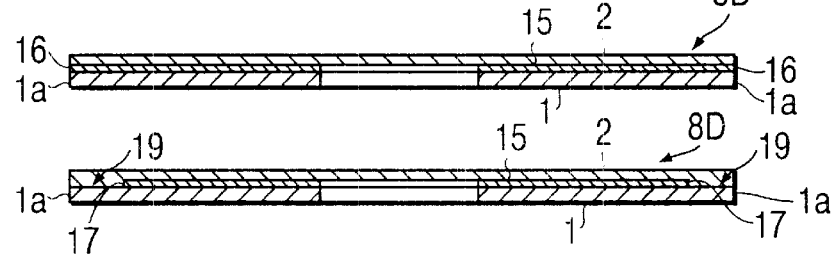
FIG. 7(d)
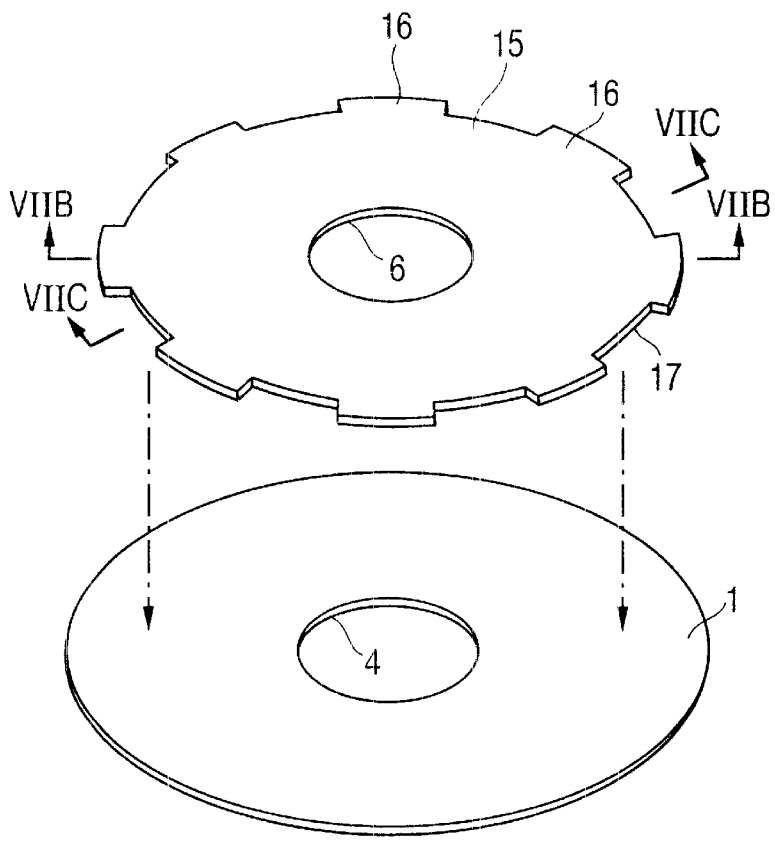

FIG. 8(a)
FIG. 8(b)
FIG. 8(c)
FIG. 8(d)
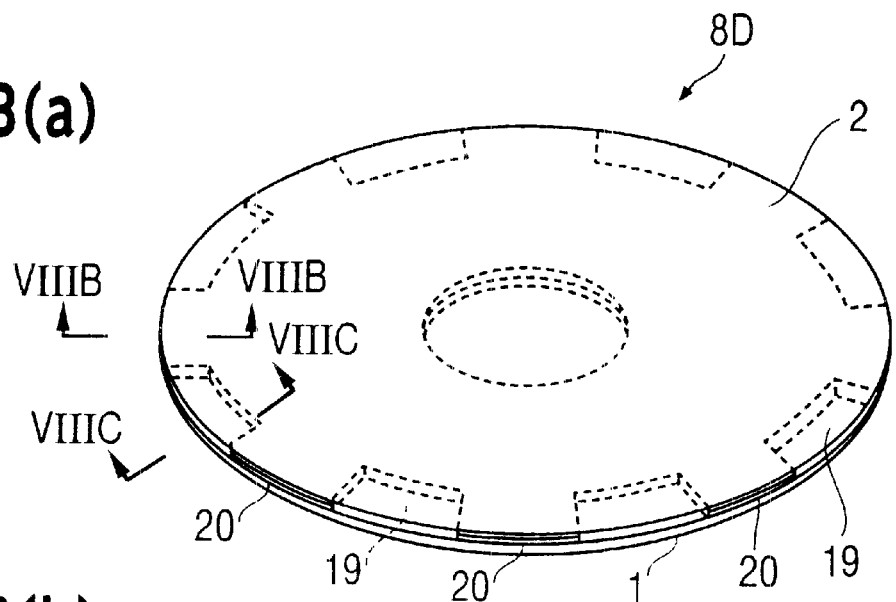
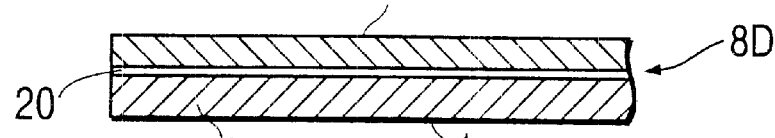
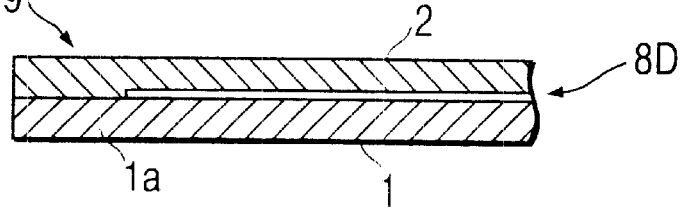
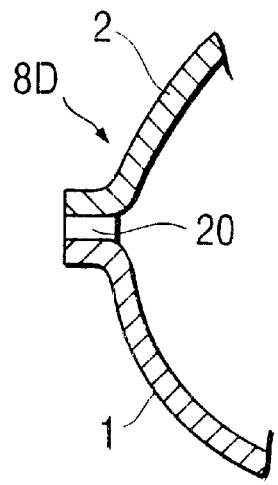

RESIN AIR BAG

This application is a divisional application of application Ser. No. 08/906,831, filed Aug. 6, 1997, entitled RESIN AIR BAG AND METHOD OF MAKING THEREOF now U.S. Pat. No. 6,180,044.

BACKGROUND OF THE INVENTION

The present invention relates to an air bag composed of resin sheets and its production method. The purpose of an air bag device is to protect an occupant by deploying an air bag when a vehicle comes into collision.

Conventionally, an air bag is typically made of a woven textile of fiber, such as a polyamide fiber, surfaced with a silicone rubber coating. In recent years, however, an air bag made of heat resisting resin sheets (Japanese Unexamined Patent Publication No. H2-31965/1990) and an air bag made of elastomer (Japanese Unexamined Patent Publication No. H4-266544/1992) have been proposed as alternatives to the conventional air bag.

The joint between heat resisting resin sheets and the joint between elastomer sheets are made by adhesion using adhesives or heat fusion in prior arts.

SUMMARY OF THE INVENTION

Joining by adhesion or heat fusion may bulk up the joint between the sheets or lower the strength due to heat.

It is an object of the present invention to provide a production method of an air bag made of resin for preventing the periphery from bulking up, providing sufficient joint strength between resin sheets, and providing sufficient strength to peripheries of the resin sheets.

It is another object of the present invention to provide an air bag made of resin having a means for discharging gas in the radial direction of the air bag.

A method of the present invention for producing a resin air bag composed of two resin sheets, namely, a first resin sheet and a second resin sheet, which are bonded to each other at the peripheries thereof. The method may comprise steps of: disposing the first resin sheet in a mold and superposing a heat resisting sheet having smaller size than that of the first resin sheet onto the first resin sheet to expose the periphery of the first resin sheet out of the heat resisting sheet; and injecting resin into the mold in such a manner as to cover the exposed periphery of the first resin sheet and the heat resisting sheet to form said second resin sheet. The injected resin may well adhere to the first resin sheet so that the injected resin adheres to the periphery of the first resin sheet.

In the aforementioned production method, the second resin sheet is composed of the resin injected into the mold and the resin adheres to the periphery of the first resin sheet. The first resin sheet is covered by the heat resisting sheet besides at the periphery thereof so that the injected resin does not come into contact with the covered portion of the first resin sheet. Therefore, the sheets are not bonded to each other over the covered portion. If the heat resisting sheet is provided with at least one extended portion extending outwardly, the first resin sheet and the second resin sheet are not bonded to each other also over the extended portion.

When the extended portion extends to a peripheral end of the first resin sheet, there is a non-bonded portion between the sheets over the extended portion. The non-bonded portion functions as a vent hole which allows gases introduced into the air bag to flow outside of the air bag.

When the extended portion does not extend to the peripheral end of the first resin sheet, the first and second resin sheets are bonded to each other at the peripheries thereof outside the extended portion. When the air bag is deployed, since the width of the bonded portion is slight, the sheets at this portion are separated from each other due to gas pressure introduced from an inflator in such a manner as to form a vent hole.

PREFERRED EMBODIMENTS OF THE INVENTION

Hereinafter, embodiments of the invention will be described with reference to the drawings. FIG. 1(a) is a sectional view of a mold for explaining a production method of a resin air bag according to the embodiment of the present invention. FIG. 1(b) is a sectional view of the produced air bag. FIG. 1(c) is a perspective view showing a resin sheet and a heat resisting sheet.

The air bag produced in this manner comprises a first resin sheet 1 and second resin sheet 2 of which peripheries 1a and 2a are bonded. To produce the air bag, the first resin sheet 1 is placed in the mold 7 and a heat resisting sheet 3 is placed on the first resin sheet 1. The resin sheet 1 and the heat resisting sheet 3 are provided with inflator through holes 4, 6, respectively which are engaged to a convex portion 10 of the mold. The sheet 1 is provided with vent holes 5.

The mold 7 has a sprue 11 and a sprue bushing end 12 disposed to face the convex portion 10. The second resin sheet 2 is molded by an injection molding method in which a nozzle of an injection molding press is brought in contact with the sprue bushing end 12 and thermoplastic resin is injected from a sprue 11 into a cavity 13.

In this embodiment, the cavity 13 has an inner diameter greater than the outer diameter of the first resin sheet 1 so that the second resin sheet 2 is formed to extend to the peripheral edge face; (i.e. outer edge surface) of the first resin sheet 1. The injected resin adheres very well to the first resin sheet so that the injected resin adheres to the first resin sheet during a cooling process after the injection process. On the other hand, the heat resisting sheet 3 does not have an adhesive property relative to the injected resin so that the injected resin does not adhere to the heat resisting sheet 3.

After the injected resin is cooled enough, the mold 7 is opened to take out the air bag 8 thus produced. Then, the heat resisting sheet 3 is taken out through the inflator through hole 4. It should be noted that, in a case where the heat resisting sheet 3 is thin, it may be left in the air bag as a flame proofing material.

FIG. 9(a) is a sectional view showing the deployment configuration of the air bag 8 produced in this manner. The air bag shown in FIG. 9(a) is of a type in which the heat resisting sheet 3 is taken out.

Though the cavity 13 is larger than the first resin sheet 1 in the embodiment of FIGS. 1(a) through 1(c), the first resin sheet 1 may be formed in size such that the outer periphery thereof 1b comes in contact with the inner periphery 13a of the cavity 13 as shown in FIG. 2(a) in this invention. In this case, like the air bag 8A shown in FIG. 2(b), a periphery 2b of the second resin sheet 2 adheres only to the upper surface of the peripheral portion 1a of the first resin sheet 1.

Though the sprue bushing end 12 is disposed in the center of the mold in the embodiments of FIGS. 1 and 2, sprue bushing ends may be disposed near the periphery of the molds 7A, 7B as shown in FIGS. 3(a) and 3(b).

According to the present invention, a multipoint gate 14 may be employed instead of the convex portion 10 as shown in FIG. 4(a). FIG. 4(b) is a sectional view of a resin air bag 8B produced in this manner.

FIGS. 5(a) through 5(d) and FIGS. 6(a) through 6(d) show another embodiment of the present invention. FIG. 5(a) is a sectional view of a mold, FIGS. 5(b) and 5(c) are sectional views of an air bag just after being molded, and FIG. 5(d) is a perspective view showing the heat resisting sheet 15 and the first resin sheet 1. FIGS. 5(b) and 5(c) show sections taken along the line VB—VB and the line VC—VC of FIG. 5(d), respectively. FIG. 6(a) shows a perspective view of the air bag produced in the manner. FIGS. 6(b) and 6(c) show sections taken along the line VIB—VIB and the line VIC—VIC of FIG. 6(a), respectively, and FIG. 6(d) is a sectional view of parts of the air bag in the deployed state. This embodiment shows an air bag having vent holes formed by gases that are blown into the air bag and its production method.

A heat resisting sheet 15 employed in this embodiment is provided with a plurality of extended portions 16 as shown in FIG. 5(d). A first resin sheet 1 does not have any vent hole. The other compositions are same as shown in FIG. 2. A second resin sheet 2 is formed by positioning the sheet 1 and the heat resisting sheet 15 in the mold 7 and then injecting resin through the sprue bushing end 12.

In the resin air bag thus produced, as shown in FIG. 6(a), bonded areas of the sheets 1 and 2 are decreased at the extended portions 16 of the heat resisting sheet 15 to make low bond strength portions 18. On the other hand, bonded areas of the sheets 1 and 2 are increased at withdrawn portions 17 between the adjacent extended portions 16 to make high bond strength portions 19. As gases are blown into the air bag as structured above, the air bag is deployed as shown in FIG. 6(d) and FIG. 9(b) so that the sheets 1 and 2 are separated at the low bond strength portions 18 so as to make vent holes 20.

FIGS. 7(a) through 7(d) and FIGS. 8(a) through 8(d) show still another embodiment of the present invention which uses a heat resisting sheet 15 with extended portions 16 like the above embodiment of FIGS. 5(a) through 5(d) and FIGS. 6(a) through 6(d). In this embodiment, however, the extended portions 16 of the heat resisting sheet 15 extend to the peripheral end 1a of the first resin sheet 1. Also in this case, the second resin sheet 2 is formed by injecting resin through a sprue bushing end 12 of the mold 7.

As shown in FIGS. 8(a) through 8(d), the portions of the sheets 1 and 2 where the extended portions 16 were placed are not bonded and are provided with vent holes 20 formed therein. The sheets 1 and 2 are strongly bonded at the portions where the withdrawn portions 17 of the heat resisting sheet 15 were placed, so as to make high bond strength portions 19 that are never separated even when gases are introduced into the air bag from an inflator.

The air bag having vent holes 20 may be used for an inner air bag 22 of a dual air bag comprising the inner air bag 22 and an outer air bag 23 as shown in FIG. 9(b). In this case, the outer air bag 23 is also preferably made of resin. In the dual air bag of FIG. 9(c), gas from an inflator is introduced in the radial directions of the air bag by the inner air bag 22 so that the outer air bag 23 is rapidly deployed radially and then deployed toward an occupant.

In the present invention, the first resin sheet and the second resin sheet are preferably made of the same kind of resin. It is preferable that the resin is a synthetic resin such as a thermoplastic elastomer, more particularly thermoplastic polyurethane. The heat resisting sheet 3 is preferably made with a silicone coated nylon fabric, a glass fiber reinforced fluorocarbon resin (e.g. PTFE) fabric, or an aromatic polyamide fabric.

Though all the aforementioned embodiments relate to a driver-side air bag, the present invention may be applied to production of an air bag for a passenger seat or a rear seat.

As is apparent from the above description, according to the production method of a resin air bag of the present invention, a first resin sheet and a second resin sheet can be bonded at the peripheries thereof by and at the same time as the injection molding of the second resin sheet, thereby facilitating the production of the air bag. The production method according to the present invention makes the joint to have quite high bond strength and does not bulk up the joint, thereby decreasing the volume of the air bag in the folded state. According to the present invention, vent holes are easily formed at the joint between the sheets.

BRIEF DESCRIPTION OF THE DRAWINGS

FIG. 1(a) is a sectional view of a mold; FIG. 1(b) is a sectional view of an air bag; and FIG. 1(c) is a perspective view of a first resin sheet and a heat resisting sheet;

FIGS. 5(b) and 5(c) are sectional views of an air bag, wherein FIG. 5(b) is a sectional view taken along the line of VB—VB of FIG. 5(d), and wherein FIG. 5(c) is a sectional view taken along the line of VC—VC of FIG. 5(d)

FIG. 7(a) is a sectional view of a mold used in a method of an embodiment; FIGS. 7(b) and 7(c) are sectional views of an air bag; FIG. 7(b) is a sectional view taken along the line VIIB—VIIB of FIG. 7(d); FIG. 7(c) is a sectional view taken along the line VIIC—VIIC of FIG. 7(d); and FIG. 7(d) is a perspective view of a first resin sheet and a heat resisting sheet; and FIG. 8(a) is a perspective view of the air bag produced by the method of FIGS. 7(a) through 7(d); FIG. 8(b) is a sectional view taken along the line VIIIB—VIIIB of FIG. 8(a); FIG. 8(c) is a sectional view taken along the line VIIIC—VIIIC of FIG. 8(a); and FIG. 8(d) is a sectional view showing main components of air bag in the deployed state.

Figure 1A:
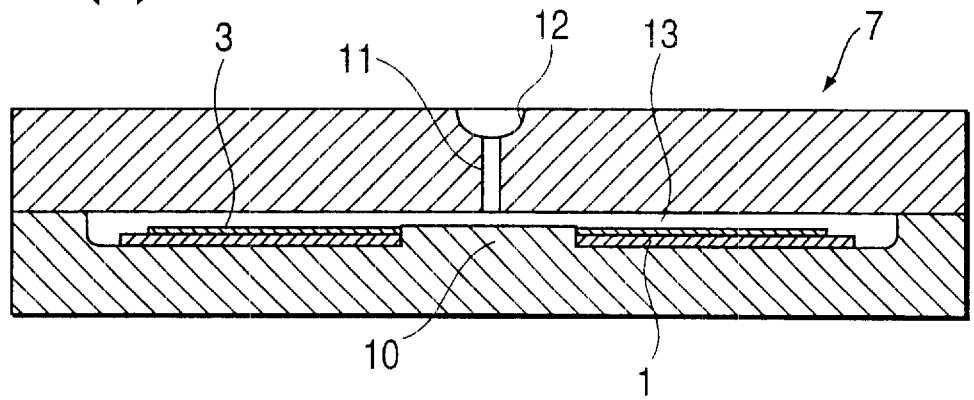
FIGS. 1(a) through 1(c) are views for explaining an embodiment.
Figure 1B:
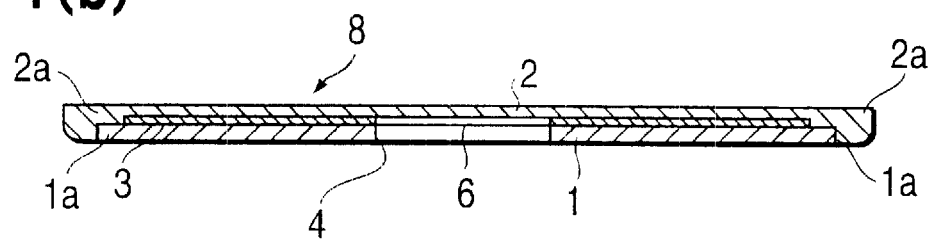
Figure 1C:
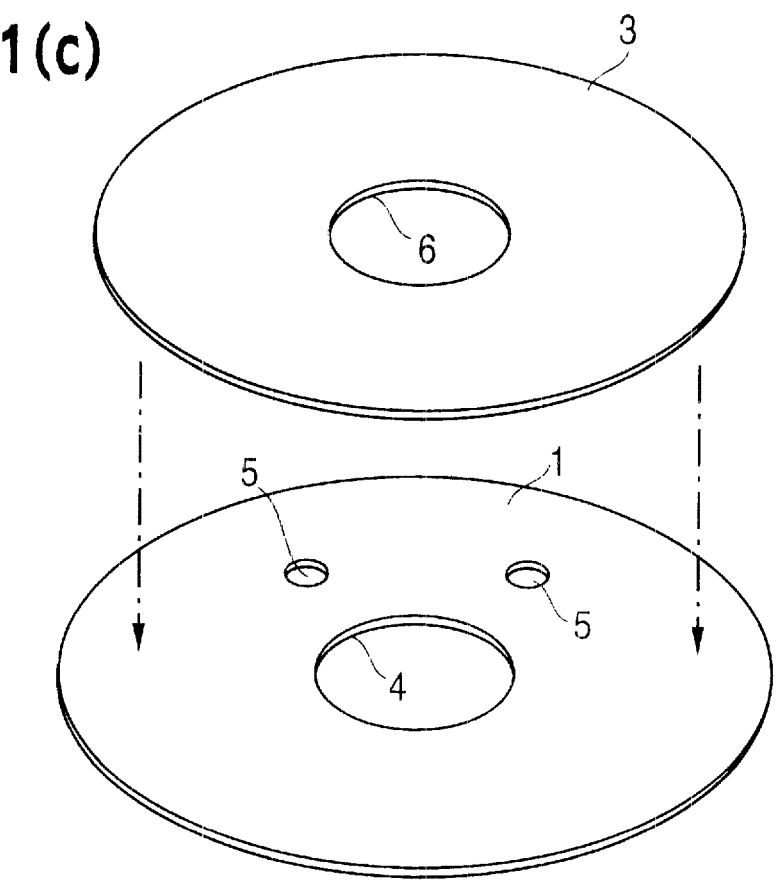
Figure 2A:
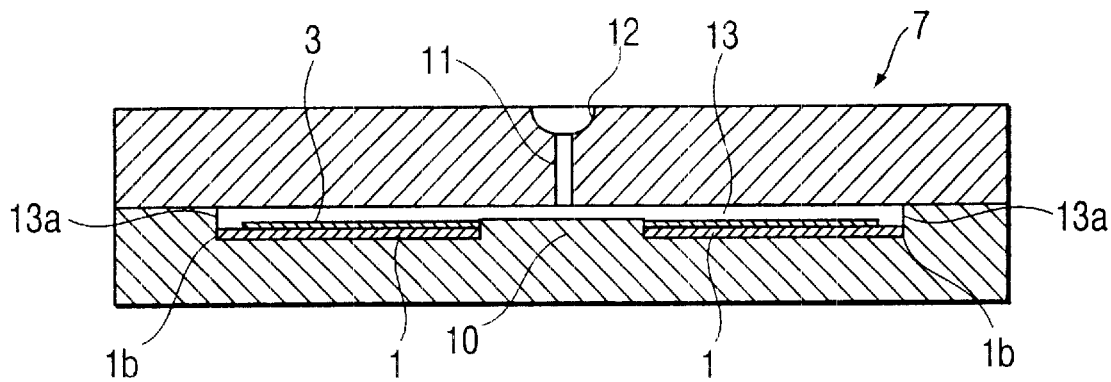
FIG. 2(a) is a sectional view of a mold showing another embodiment.
Figure 2B:
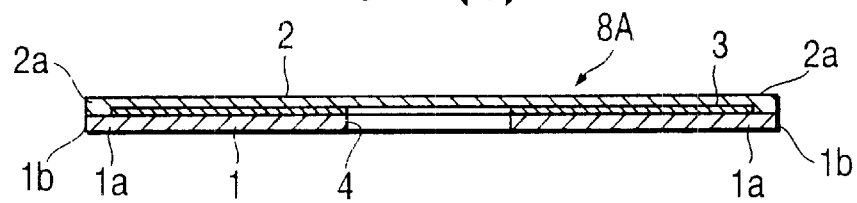
FIG. 2(b) is a sectional view of an air bag.
Figure 3A:
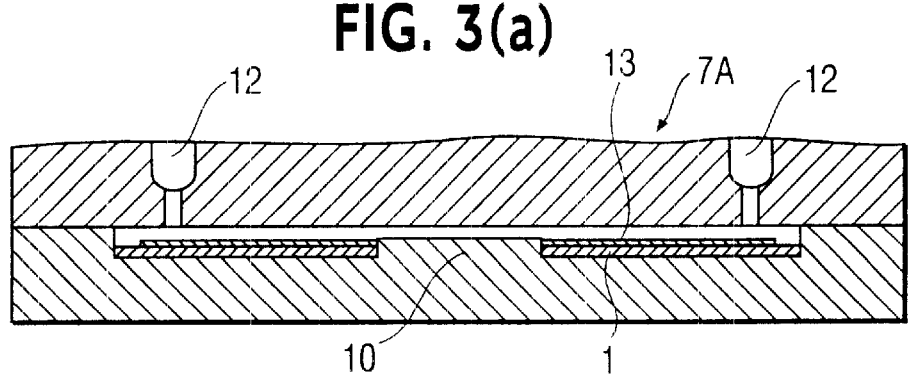
FIGS. 3(a) and 3(b) are sectional views of molds showing yet another embodiments, respectively.
Figure 3B:
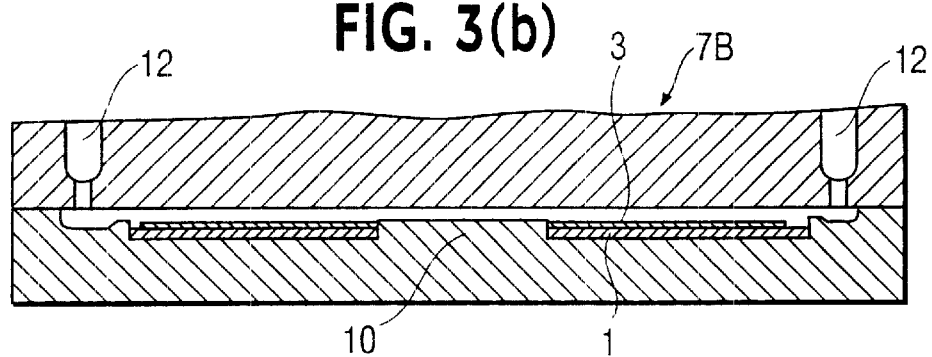
Figure 4A:
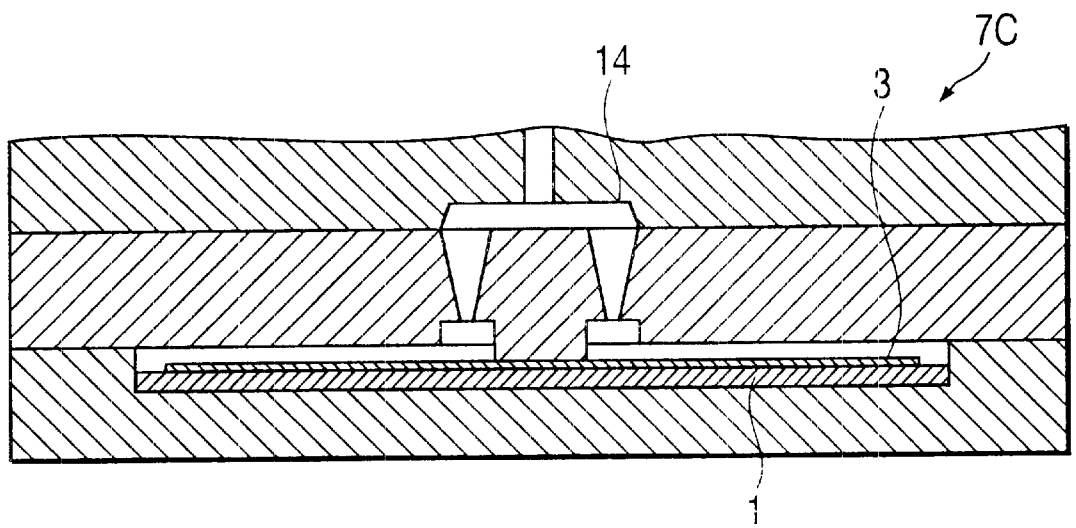
FIG. 4(a) is a sectional view of a mold showing further another embodiment.
Figure 4B:
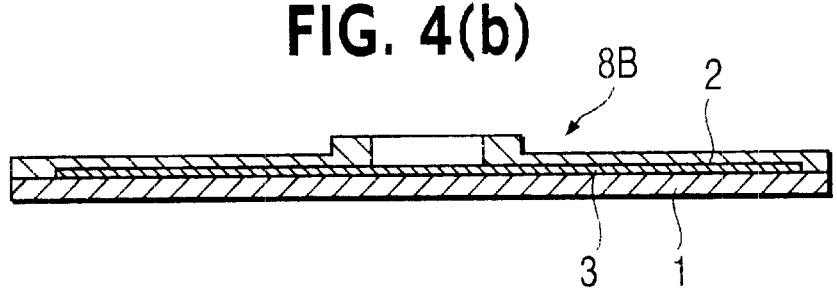
FIG. 4(b) is a sectional view of an air bag.
Figure 5A:
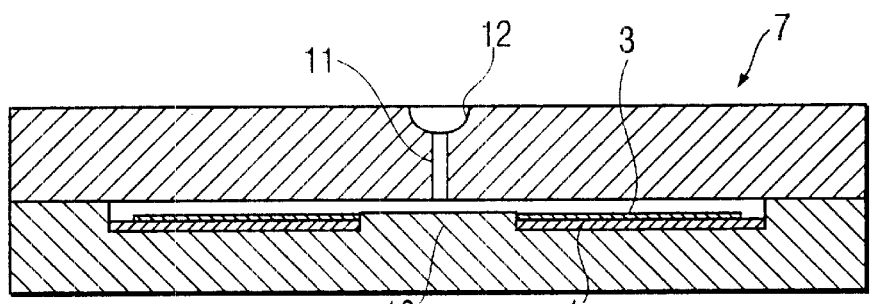
FIG. 5(a) is a sectional view of a mold used in the method of an embodiment.
Figure 5B:
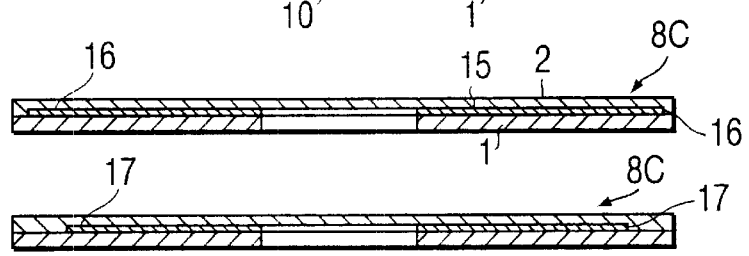
Figure 5C:
Figure 5D:
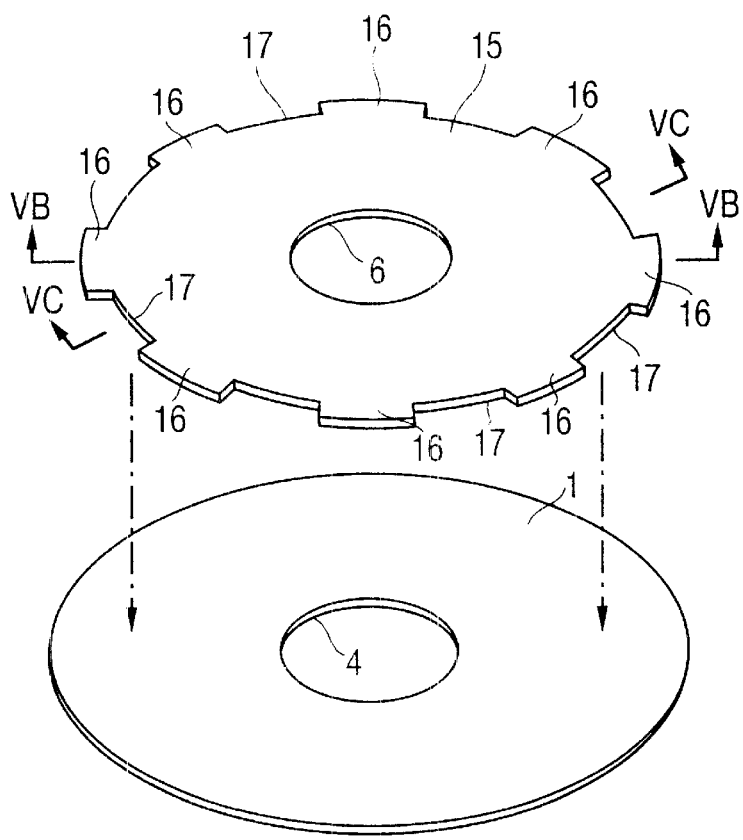
FIG. 5(d) is a perspective view of a first resin sheet and a heat resisting sheet.
Figure 6A:
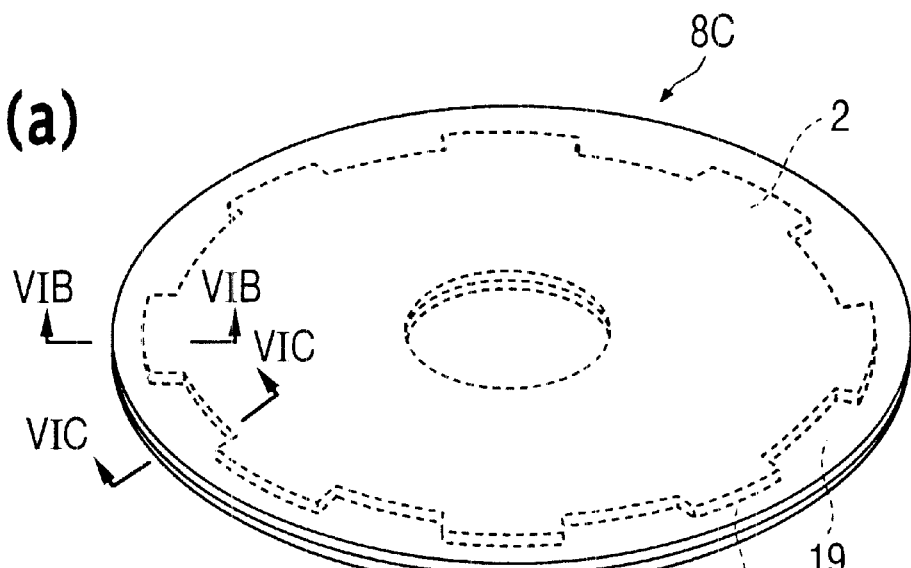
FIG. 6(a) is a perspective view of an air bag produced by the method of FIGS. 5(a) through 5(d)
Figure 6B:
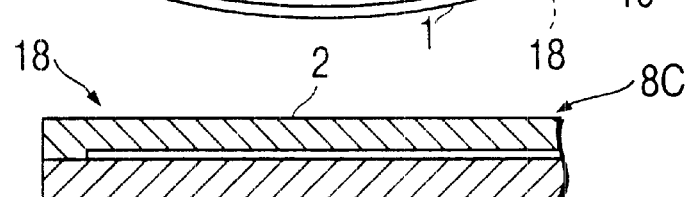
FIG. 6(b) is a sectional view taken along the line VIB—VIB of FIG. 6(a)
Figure 6C:
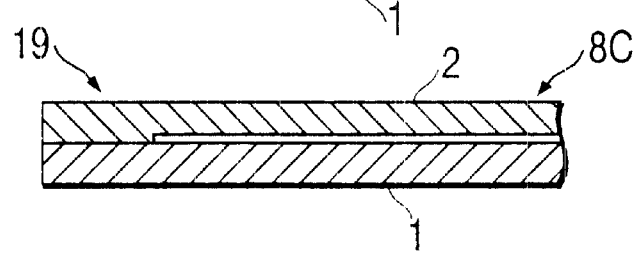
FIG. 6(c) is a sectional view taken along the line VIC—VIC of FIG. 6(a)
Figure 6D:
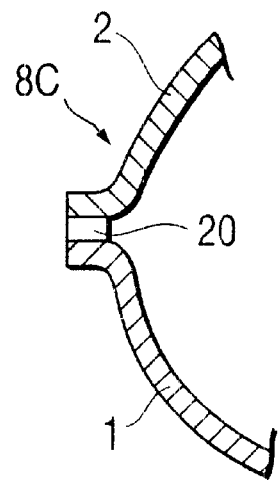
FIG. 6(d) is a sectional view showing main components of air bag in the deployed state.
Figure 9A:
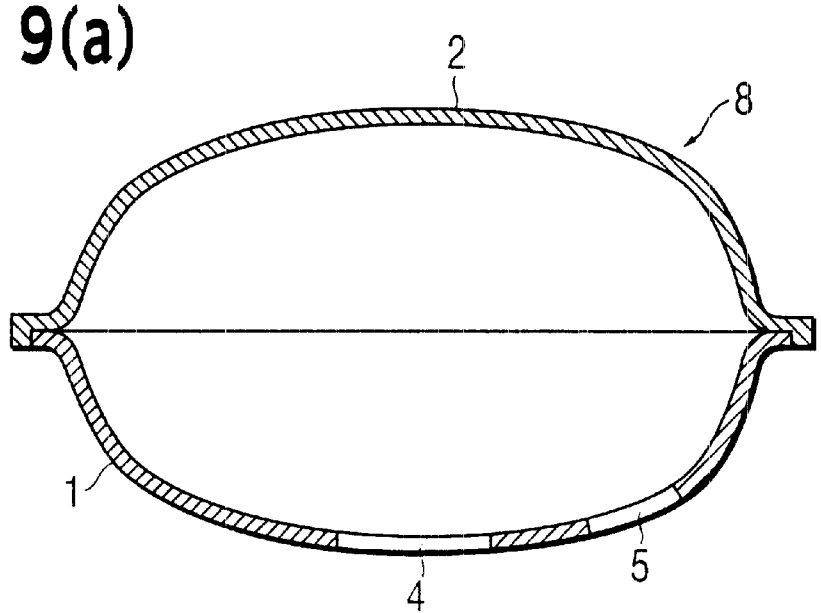
FIG. 9(a) is a sectional view showing the deployed configuration of an air bag produced according to the method of the present invention.
Figure 9B:
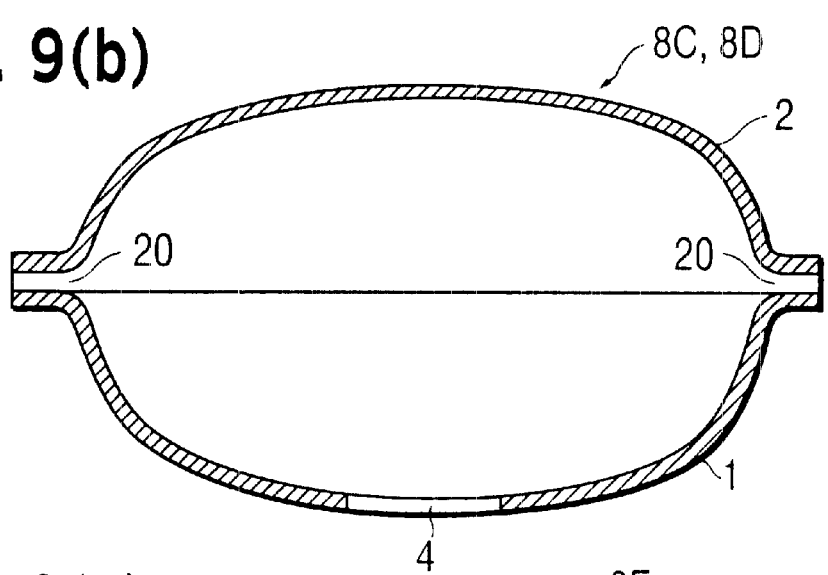
FIG. 9(b) is a sectional view of a deployed airbag according to the present invention showing the vent holes between the separated sheets.
Figure 9C:
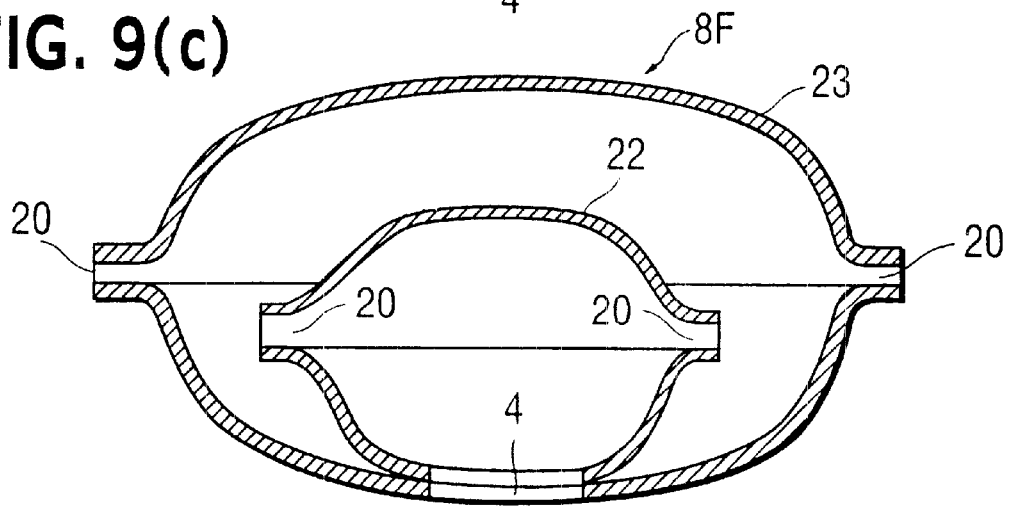
FIG. 9(c) is sectional view of a dual air bag according to the present invention.

What is claimed is:

1. An air bag comprising:

a first resin sheet having top and bottom surfaces;

a second resin sheet overlying the top surface of the first resin sheet and being bonded to the top surface of the first resin sheet along a periphery of the sheets so that pressurized gas may be retained between the first and second resin sheets;

a sheet of heat resistant material freely disposed between the first and second resin sheets and having a radially extending portion disposed between the periphery of the first and second resin sheets to form an area of the top surface of the first resin sheet where the strength of the bond between the first and second resin sheets is reduced so that when pressurized gas is introduced between the first and second resin sheets the first and second resin sheets separate to form a vent hole in the air bag.

2. The air bag of claim 1, wherein the radially extending portion extends to an edge of the first resin sheet.

3. The air bag of claim 1, wherein the sheet of heat resistant material comprises a plurality of radially extending portions.

4. The air bag of claim 1, wherein the air bag is disposed within a second air bag.

5. An air bag comprising:

a first resin sheet having top and bottom surfaces;

a second resin sheet overlying the resin sheet and being bonded to the top surface of the first resin sheet along a periphery of the sheets so that pressurized gas may be retained between the first and second resin sheets;

a sheet of heat resistant material disposed between the first and second resin sheets;

wherein the airbag includes an area along the periphery of the bonded sheets where the strength of the bond between the first and second resin sheets is reduced so that when pressurized gas is introduced between the first and second resin sheets the first and second resin sheets separate to form a vent hole.

6. The air bag of claim 5, wherein the sheet of heat resistant material includes radially extending portions that prevent bonding between the first and second resin sheets thereby forming the area of reduced bond strength.

7. The air bag of claim 6, wherein the radially extending portions extend to an edge of the first sheet of resin material.

8. An air bag comprising:

a first resin sheet having top and bottom surfaces and an outer edge surface;

a second resin sheet overlying the first resin sheet and extending beyond the first resin sheet to cover the outer edge surface of the first resin sheet and being bonded to the outer edge surface and the top surface of the first resin sheet along a periphery of the sheets so that pressurized gas may be retained between the first and second resin sheets; and a sheet of heat resistant material freely disposed between the first and second resin sheets.

9. The air bag of claim 8, further comprising vent holes to allow pressurized gas to escape from between the first and second resin sheets.

* * * * *